US010162902B2

(12) United States Patent
Boudreau et al.

(10) Patent No.: US 10,162,902 B2
(45) Date of Patent: Dec. 25, 2018

(54) COGNITIVE RECAPITULATION OF SOCIAL MEDIA CONTENT

(71) Applicant: International Business Machines Corporation, Armonk, NY (US)

(72) Inventors: Michael K. Boudreau, Orange, CA (US); Jia Chen, Ossining, NY (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/279,786

(22) Filed: Sep. 29, 2016

(65) Prior Publication Data

US 2018/0089319 A1 Mar. 29, 2018

(51) Int. Cl.
*G06F 7/00* (2006.01)
*G06F 17/30* (2006.01)
*G10L 25/63* (2013.01)
*G06K 9/00* (2006.01)

(52) U.S. Cl.
CPC .... *G06F 17/30867* (2013.01); *G06F 17/3053* (2013.01); *G06F 17/30551* (2013.01); *G06F 17/30554* (2013.01); *G06K 9/00677* (2013.01); *G10L 25/63* (2013.01)

(58) Field of Classification Search
USPC .................................. 705/319; 707/725, 732
See application file for complete search history.

(56) References Cited

U.S. PATENT DOCUMENTS

| 9,183,172 | B1 * | 11/2015 | Anderson | .......... H04N 21/4788 |
| 9,202,251 | B2 * | 12/2015 | Bist | .................... G06F 17/30032 |
| 2007/0233622 | A1 * | 10/2007 | Willcock | .......... G06F 17/30867 706/16 |
| 2009/0187865 | A1 * | 7/2009 | Brownholtz | ...... G06F 17/30873 715/854 |
| 2011/0225043 | A1 * | 9/2011 | Bhatia | .................... G06Q 10/00 705/14.53 |

(Continued)

FOREIGN PATENT DOCUMENTS

WO 2012126741 A2 9/2012

OTHER PUBLICATIONS

IP.com, Method and System for Augmented Information Display in Social Network Photograph, Dec. 18, 2014.

(Continued)

*Primary Examiner* — Cheyne D Ly
(74) *Attorney, Agent, or Firm* — Garg Law Firm, PLLC; Rakesh Garg; Christopher K. McLane (57) ABSTRACT

A feedback value of a user is received, the feedback value corresponding to a content of a current post on a social media service. The content is analyzed to determine a context of the current post. A range of feedback values is computed corresponding to the context. When the feedback value is outside the range of feedback values, a set of contents is computed, the set of contents spanning a period prior to a time of the current post, and the set of contents corresponding to the context. The set of contents omits another post that is within the period and is related to the current post. A recap timeline is constructed using the set of contents and rendered relative to the current post.

18 Claims, 5 Drawing Sheets

(56) References Cited

U.S. PATENT DOCUMENTS

| | | | |
|---|---|---|---|
| 2011/0225049 A1* | 9/2011 | Bhatia | G06Q 30/02 705/14.66 |
| 2012/0144343 A1 | 6/2012 | Tseng | |
| 2012/0265811 A1* | 10/2012 | Bist | G06Q 10/10 709/204 |
| 2013/0254022 A1 | 9/2013 | Rubrecht | |
| 2014/0067825 A1* | 3/2014 | Oztaskent | H04N 21/4782 707/748 |
| 2014/0324805 A1* | 10/2014 | Agarwal | G06F 17/30864 707/706 |
| 2015/0319119 A1* | 11/2015 | Ryu | H04L 51/10 715/752 |
| 2016/0063117 A1* | 3/2016 | Carter | G06F 17/30867 707/727 |
| 2016/0072903 A1* | 3/2016 | Chakra | G06F 17/2785 704/9 |

OTHER PUBLICATIONS

IP.com, Dynamic White Walling Social Network Activities Based on Recipient's Visual Literacy Index, Oct. 23, 2014.

IP.com, Method and system for social network photograph display during advertisement, Jun. 16, 2015.

* cited by examiner

COGNITIVE RECAPITULATION OF SOCIAL MEDIA CONTENT

TECHNICAL FIELD

The present invention relates generally to a method, system, and computer program product for selectively reviewing social media content. More particularly, the present invention relates to a method, system, and computer program product for cognitive recapitulation of social media content.

BACKGROUND

Social media comprises any medium, network, channel, or technology for facilitating communication between a large number of individuals and/or entities (users). Some common examples of social media are Facebook or Twitter, each of which facilitates communications in a variety of forms between large numbers of users (Facebook is a trademark of Facebook, Inc. in the United States and in other countries. Twitter is a trademark of Twitter Inc. in the United States and in other countries.) Social media, such as Facebook or Twitter, allow users to interact with one another individually, in a group, according to common interests, casually or in response to an event or occurrence, and generally for any reason or no reason at all.

Some other examples of social media are websites or data sources associated with radio stations, news channels, magazines, publications, blogs, and sources or disseminators of news or information. Some more examples of social media are websites or repositories associated with specific industries, interest groups, action groups, committees, organizations, teams, or other associations of users.

Data from social media comprises unidirectional sharing of content, bi-directional messages, or broadcast communications in a variety of languages and forms. Such communications in the social media are commonly referred to as "posts". The contents of posts can include natural language conversation, images, multimedia, and/or links or references, any of which can be in proprietary conversational styles, slangs or acronyms, urban phrases in a given context, formalized writing or publication, and other structured or unstructured data.

Generally, a timeline is a temporal ordering of events. A timeline of posts in social media is a temporal ordering of posts that have been contributed by a user during a period covered by the timeline.

SUMMARY

The illustrative embodiments provide a method, system, and computer program product. An embodiment includes a method that receives a feedback value of a user, the feedback value corresponding to a content of a current post on a social media service. The embodiment analyzes the content to determine a context of the current post. The embodiment computes a range of feedback values corresponding to the context. The embodiment selects, responsive to the feedback value being outside the range of feedback values, a set of contents, the set of contents spanning a period prior to a time of the current post, and the set of contents corresponding to the context, wherein the set of contents omits another post that is within the period and is related to the current post. The embodiment constructs a recap timeline using the set of contents. The embodiment renders the recap timeline relative to the current post.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that a user may access a social media client and see some content that evokes a response in the user. For example, a user may login to the social media service after a period, having missed staying current on the posts that were posted during that period. Upon login after a period of absence, the user may be presented with a current post that may shock or confuse the user because the user has missed the preceding one or more posts that establish the context of the current post. For example, the current post may be a picture of a friend on honeymoon, which may shock the user because the user missed the posts of the friend announcing the engagement, wedding planning, wedding, and the reception, which was followed by the post about the honeymoon, where the user first finds out that the friend is married.

The illustrative embodiments recognize that a period between logins is not the only reason that a current post might evoke a response from a user. A post about the death of a friend, a birth in a friend's family, a failure of an endeavor of a friend, and a success of a friend in an endeavor, are some other examples that have the potential of evoking strong responses in a user. The response may also be due to an emotional tendency of the user, a subject of a post, an environmental or ambient factor acting upon the user at the time the user is presented with a post, or some combination of these and other factors.

For example, the user may generally be a person who generally responds strongly towards communications with friends. As another example, the user may be under stress—an example of an external environmental factor—when viewing a post. As another example, the subject-matter of the post may be one which normally evokes strong responses in users. Of course, a combination of these reasons, with or without the exacerbation from the user being away from social media for a period, can cause various degrees of responses in a user.

The illustrative embodiments further recognize that the response of a user includes overt or covert feedbacks from the user, which can be measured. As a non-limiting example, the user may make a facial expression of surprise, confusion, frustration, anger, or another emotive expression, as a response to a post. The facial expression can be recognized, e.g., by using a camera and an image processing tool, and measured according to a suitable calibration to quantify the user's feedback.

Similarly, as another non-limiting example, the user may verbally utter an expression of surprise, confusion, frustration, anger, or another emotive expression, as a response to a post. The uttered expression can be recognized, e.g., by using a microphone and an audio processing tool, and measured according to a suitable calibration to quantify the user's feedback.

Similarly, as some other non-limiting examples, the user may exhibit other biometric responses towards a post. For example, the user may perspire, have dilated pupils, have increased skin conductivity, experience elevated heartrate, and/or other biometric responses corresponding to an expression of surprise, confusion, frustration, anger, or another emotive expression, as a response to a post. A biometric response can be recognized, e.g., by using a suitable sensor and processing tool, and measured according to a suitable calibration to quantify the user's feedback.

The illustrative embodiments recognize that when a user's emotive response is recognized and measured, the user should be assisted with more information to back-fill the context current post to which the user is responding. In other words, information that is contextually related to the current post can be useful in removing or reducing the user's emotive response to the current post.

As one non-limiting example, if the user has been away from social media for a period before having an emotive response to a current post of an author, the posts of the author during the period and related to the subject-matter of the current post should be presented to the user to bring the user's knowledge up-to-date about the contents of the current post.

As another non-limiting example, if the user is having an emotive response to a subject of a current post, the posts of other friends of the users and related to the subject can be presented to the user to supply justification or support for the subject of the current post. For example, if the subject is death, then posts of friends who discussed the illness of the deceased can be selected. As another example, if the subject is a new job, then posts of friends who discussed the unemployed status, the interview process, the potential employers or opportunities can be selected.

The illustrative embodiments recognize that presently available social media tools are unable to recognize emotive responses to posts and select other posts or content that is likely to reduce or remove that emotive response, or otherwise justify or support the content of the post. Presently, tools such as "while-you-were-away" timelines merely collect everything that was posted during the away period, and present it in chronological order, without being selective or responsive to the cognitive state of the user, the content that causes that cognitive state of the user, or both.

The illustrative embodiments recognize that different users respond to different subjects differently. For example, a user may be susceptible to having emotional responses to almost any subject, whereas another user may exhibit emotional responses to few subjects only. Accordingly, a selective timeline which recapitulates only selected posts or content—which are responsive to the cognitive state of the user, the content that causes that cognitive state of the user, or both—should also consider the variability in the user-specific emotional responses.

For example, for a user who expresses large emotional responses to just about any subject, a selective recapitulating timeline (recap timeline) may either not be needed at all, or may not contain a large volume of selected posts or content. In contrast, when a user who rarely expresses large emotional responses to a subject expresses a significant emotional response to a current post, a recap timeline may contain a substantial volume of selected posts or content.

The illustrative embodiments recognize that the presently available tools or solutions do not address these needs or provide adequate solutions for these needs. The illustrative embodiments used to describe the invention generally address and solve the above-described problems and other problems related to cognitive recapitulation of social media content.

An embodiment can be implemented as a software application. The application implementing an embodiment can be configured as a modification of an existing social media service or system, as a separate application that operates in conjunction with an existing social media service or system, a standalone application, or some combination thereof.

A measurement application according to an embodiment operates at a client device that its used by a user to view a current post on a social media service. The measurement application measures one or more types of emotive responses exhibited by the user in connection with the current post. For example, the client device may be configured with a camera to recognize a visible expression, a microphone to recognize an audible expression, a biometric sensor to detect a configured biometric parameter, or some combination thereof. Using one or more detections, the measurement application quantifies the expression into a measured value of the user's feedback to the current post.

Optionally, the measurement application may also detect, measure, and quantify an external factor, such as a condition in an environment or ambience in which the user is present while providing the feedback. For example, a noisy environment can increase stress, which can amplify a feedback; hot weather can have a similar effect; a quiet place can reduce the feedback for one user or allow another user to fully express an emotion and therefore amplify the feedback depending on the user.

An embodiment operating in conjunction with a social media service receives from the measurement application a measurement of a feedback. The feedback is in response to a current post that has been presented to the user by the social media service.

The embodiment analyzes the content of the current post. For example, the embodiment performs a shallow parse of the content of the current post using Natural Language Processing (NLP) to determine a subject-matter, topic, or context of the current post.

The embodiment may also analyze the content for readability or understandability. For example, a complicated sentence structure can evoke confusion as compared to when the same idea is presented in a simple sentence structure. As another example, the understandability of technical content may be less than the understandability of the daily news. As another example, content that includes external references to other content elsewhere may not be as readable as content that includes all the information from the external source without the external reference.

A degree of readability is a measurement of an ease or interruption with which a given content can be read. A degree of readability is correlated to an amplitude of an emotive response or feedback by a function.

A degree of understandability is a measurement of comprehension of a given content. A degree of understandability is also correlated to an amplitude of an emotive response or feedback by the same or a different function.

An embodiment computes a range of feedback value corresponding to the current post. The range is bound by at least one threshold value. The embodiment can be configured to compute the range and the related threshold or thresholds based on a variety of factors.

For example, one embodiment computes or adjusts the range based on the readability of the content of the current post. Another embodiment computes or adjusts the range based on the understandability of the content of the current post. Another embodiment computes or adjusts the range based on the subject-matter or context of the content of the current post. Another embodiment computes or adjusts the range based on the historically constructed emotional profile of the user. Another embodiment computes or adjusts the range based on the period between logins of the user. An embodiment can be configured to compute or adjust the range of feedback using any combination of these and other factors.

An embodiment determines whether the feedback measurement received from the measurement application is within the determined range of feedback values. When the measured feedback of the user falls outside the determined range for the current post, and if not already determined, the embodiment analyzes the content to determine a context or subject-matter of the current post.

The embodiment searches posts of the author of the current post, posts of other users in the user's social network, or a combination thereof, where the context of a searched post is the same as, or within a tolerance of, the context of the current post. One embodiment also searches one or more external sources of data, wherein the external source is external to the social media service, and where the data is related to the context of the current post.

The selected posts and/or data may span a period, which can be, but need not necessarily be a period between logins. For example, a period of the selected posts may span from a time of an initial post in the selection to a time of a final post in the selection, where the user may have logged in one or more times during the period.

Using the selected posts and/or data, as the case may be, one embodiment constructs a recap timeline. A recap timeline spans the period, includes only the selected posts or data that occur during period, and omits other posts that may also occur during the period but are not selected for one or more reasons described herein.

An embodiment presents the recap timeline in any manner that might be suitable for a given implementation. For example, one non-limiting implementation may present the recap timeline as a line graph of time with posts linked or shown at discrete times along the line graph. As another non-limiting example, another implementation may present the recap timeline as an ordered stack of posts that can be accessed in a sequence.

The manner of cognitive recapitulation of social media content described herein is unavailable in the presently available methods. A method of an embodiment described herein, when implemented to execute on a device or data processing system, comprises substantial advancement of the functionality of that device or data processing system in reducing a user's emotional response to social media posts under certain circumstances.

The illustrative embodiments are described with respect to certain types of posts, content, contexts, emotions, responses, measurements, quantification, ranges, thresholds, adjustments, periods, selections, presentations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
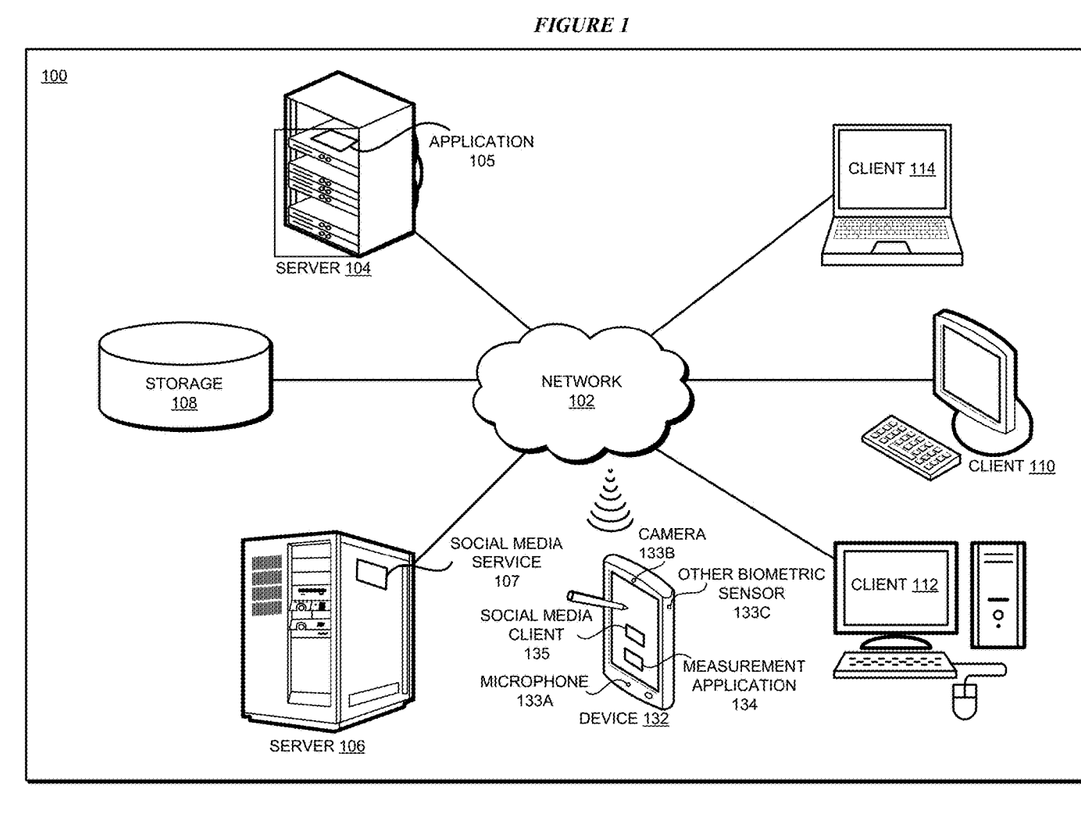
FIG. 1 depicts a block diagram of a network of data processing systems in which illustrative embodiments may be implemented.
Figure 2:
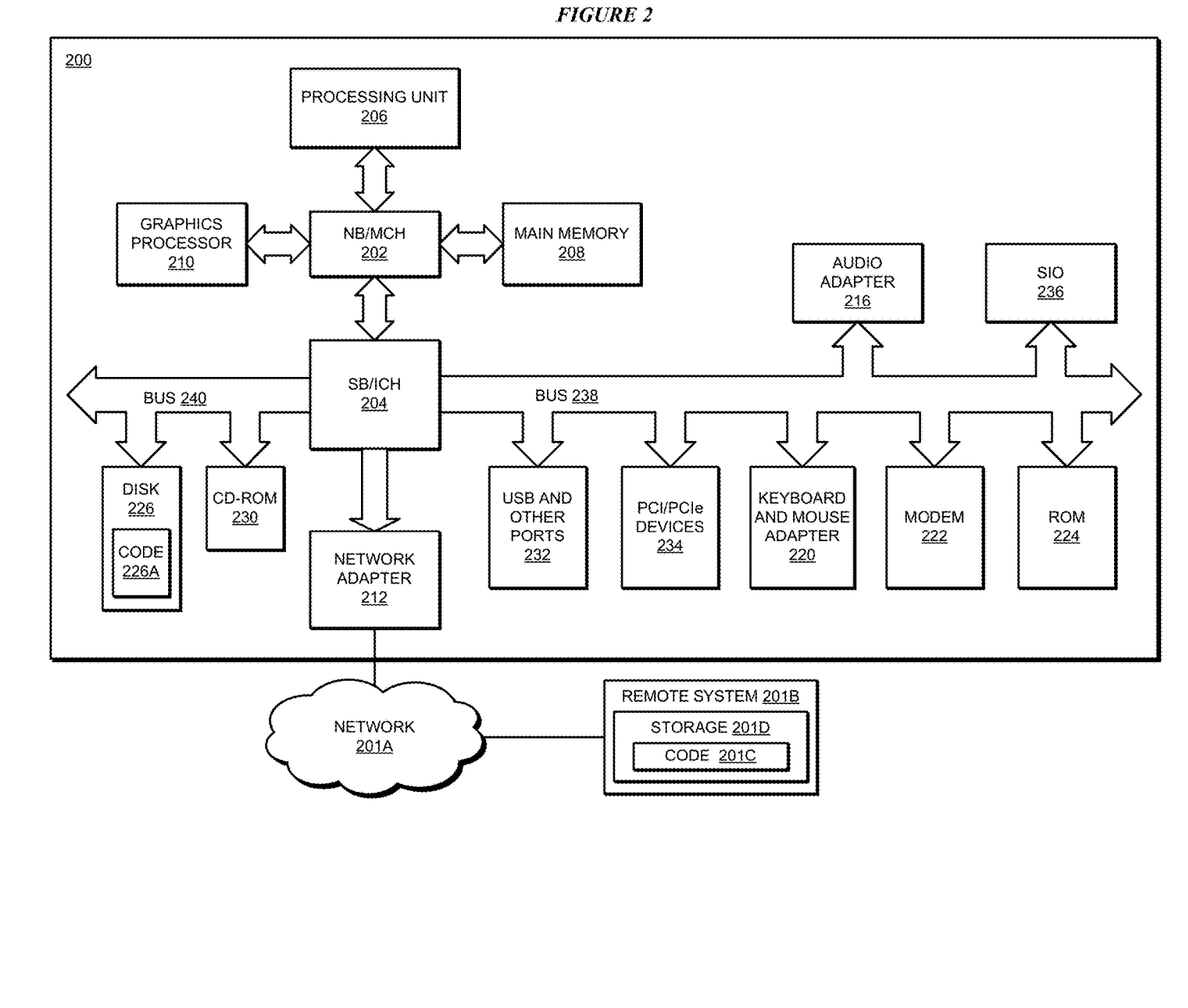
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular Implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Measurement application 134 uses one or more of microphone 133A, camera 133B, and other biometric sensor 133C to measure a user's feedback to a current post that is presented in social media client 135. Application 105 receives a feedback measurement from measurement application 134 and uses the measurement to produce the recap timeline, in a manner described herein. Application 105 operates in conjunction with social media service 107 to construct and present a recap timeline on social media client 135 in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
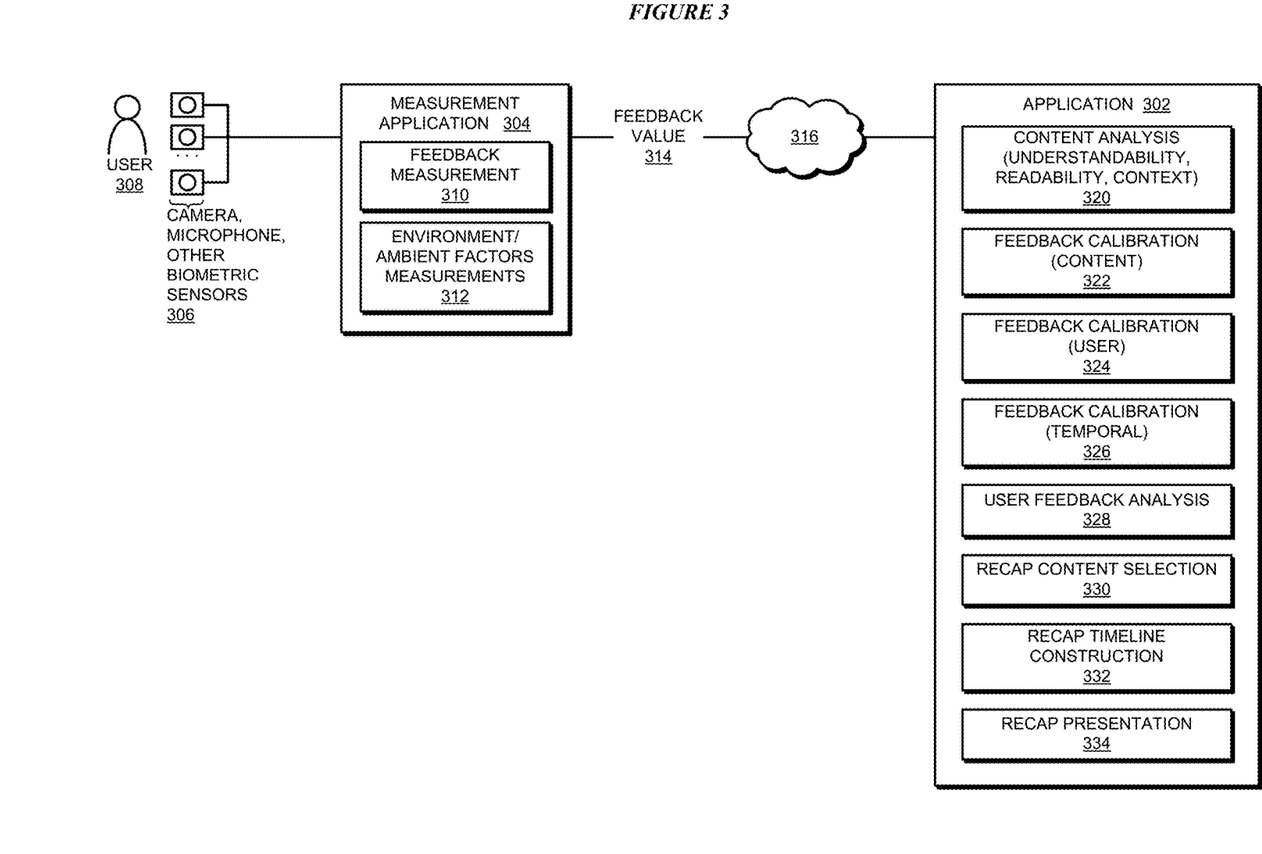
FIG. 3 depicts a block diagram of an example configuration for cognitive recapitulation of social media content in accordance with an illustrative embodiment.

With reference to FIG. 3, this figure depicts a block diagram of an example configuration for cognitive recapitulation of social media content in accordance with an illustrative embodiment. Application 302 is an example of application 105 in FIG. 1. Measurement application 304 is an example of measurement application 134 in FIG. 1. Sensor 306 include one or more of any combination of microphone 133A, camera 133B, and biometric sensor 133C in FIG. 1.

User 308 observes a current post on a social media client (not shown), such as on social media client 135 in FIG. 1, and experiences an emotive reaction. Sensor 306 detect the emotive reaction. Component 310 measures and quantifies the reaction into a feedback value.

When suitably configured, one or more of sensors 306 can also detect an external factor that influences the reaction of user 308. Component 312 measures and quantifies an external factor as described herein. Component 312 adjusts a feedback value computed by component 310 according to a measured external factor, to produce an adjusted feedback value. Either the feedback value computed by component 310 when component 312 is not measuring any external factor, or the adjusted feedback value when component 312 performs the adjustment, is sent as feedback value 314 to application 302 over data network 316. Data network 316 is similar to network 102 in FIG. 1.

Component 320 analyzes the content of the current post, e.g., for readability analysis, understandability analysis, and/or context determination, as described herein. Component 322 calibrates or sets a suitable range of feedback for the content of the current post given the analysis of component 320. As described earlier, the range of feedback can be defined by one or more threshold values.

Component 324 calibrates or adjusts the range determined by component 322, according to the emotional profile of user 308. An emotional profile of user 308 can be constructed in any suitable manner and is not shown in FIG. 3.

Component 326 calibrates or adjusts the range determined by component 322 or component 324, according to a temporal condition, such as, but not limited to, a period between logins by user 308, or a period over which certain events related to the context of the current post have transpired. For example, the content of the current post may describe a war in a geographical region, and a suitable period—the temporal condition—for the content can be several months over which a conflict may have brewed in the region.

Component 328 analyzes feedback value 314 to determine whether feedback value 314 is within the range of feedback values computed or adjusted by some combination of components 322, 324, and 326. When the analysis of component 328 determines that feedback value 314 is out of that range, component 330 selects other posts and/or external data—i.e., the recap content—in a manner described herein.

Component 332 constructs a recap timeline using the selected recap content. Component 334 presents the recap timeline, on the device used by user 308, in any suitable implementation-specific manner.

Figure 4:
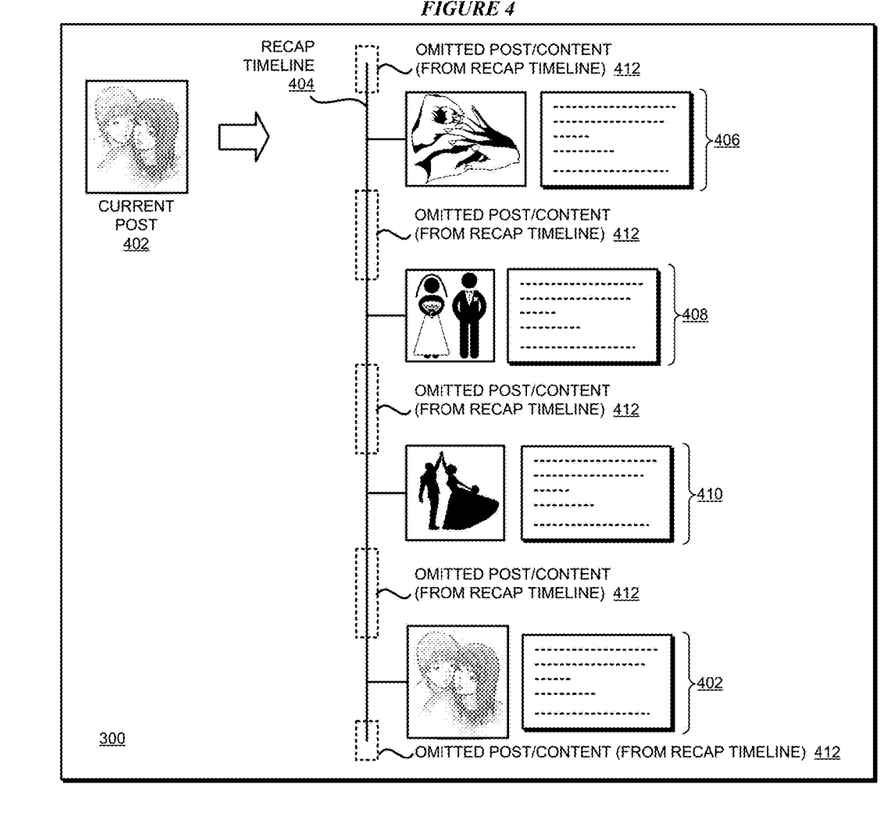
FIG. 4 depicts an example recap timeline in accordance with an illustrative embodiment.

With reference to FIG. 4, this figure depicts an example recap timeline in accordance with an illustrative embodiment. Current post 402 may be the post whose content—the image—evokes an emotive reaction from user 308 in FIG. 3.

Assume, as an example, that current post 402 is an after-marriage picture of a friend of user 308, who user 308 does not know got married. Computing user 308's feedback value and determining that the feedback value is out of a determined range, application 302 constructs recap timeline 404.

Application 302 selects posts 406, 408, and 410, which are related to the context of marriage established from current post 402. Posts 406-410 span a period during which the author of current post 402 may have posted other posts or content besides posts 406-410. Such other posts 412 may be interspersed before post 406, between posts 406, 408, 410, and current post 402, and/or after post 402. Such other posts 412 and their contents are omitted from recap timeline 404.

Recap timeline 404 is depicted in an example manner. Posts 406, 408, 410, and 402 are arranged in chronological order along a timeline graphic to enable user 308 to arrive at current post 402 starting from post 406 in a chronological order. Each of posts 406, 408, 410, and 402 may or may not include additional data, e.g., text contributed by the author or other users.

Figure 5:
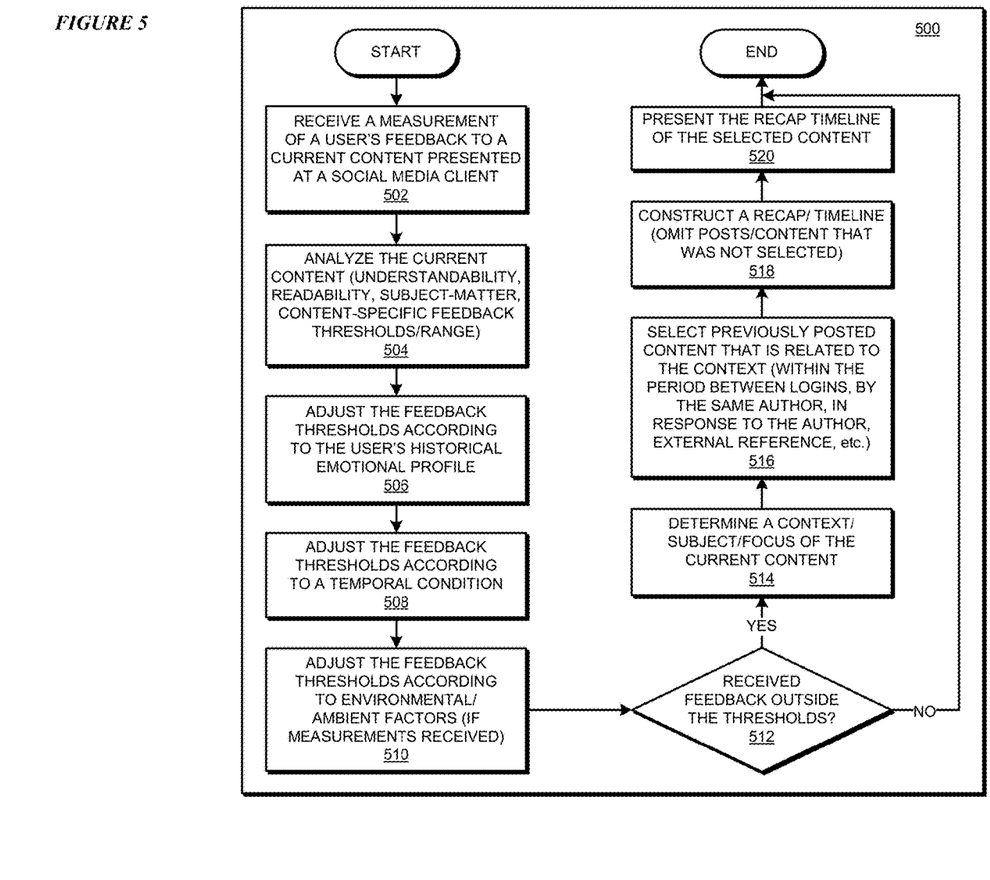
FIG. 5 depicts a flowchart of an example process for cognitive recapitulation of social media content in accordance with an illustrative embodiment.

With reference to FIG. 5, this figure depicts a flowchart of an example process for cognitive recapitulation of social media content in accordance with an illustrative embodiment. Process 500 can be implemented in application 302 in FIG. 3.

The application receives a measurement of a user's feedback to the content of a current post that was presented to the user at a social media client (block 502). The application analyzes the content for readability, understandability, subject-matter determination, and to determine the thresholds of a feedback range corresponding to the content (block 504).

The application optionally adjusts one or more thresholds of the range according to the user's historical emotional profile (block 506). From the thresholds determined at block 504 or at block 506, the application optionally adjusts one or more thresholds based on a temporal condition (block 508).

In some cases, the measurements of an external factor that influences the user's feedback may be passed to the application as well, such as by component 312 in FIG. 3. In such cases, optionally, the application may adjust the thresholds determined at block 504, 506, or 508 according to the measured external factor (block 510). Essentially, from the computations of one or more of blocks 504-510, a range of feedback values is established for the content of the current post.

The application determines whether the feedback value received in block 502 is outside the determined range (block 512). If the feedback value is within the range ("No" path of block 512), the application ends process 500 thereafter. If the feedback value is outside the determined range ("Yes" path of block 512), the application determines a context of the content of the current post, if the context has not already been determined in block 504, which may be possible in certain optimizations of process 500 (block 514).

The application selects one or more previously posted content and/or external data that corresponds to the determined context in some respect (block 516). The application constructs a recap timeline using the selected posts and/or data, which span a period, and omitting the posts that were available but were not selected from the period (block 518). The application presents the recap timeline in an implementation-specific manner (block 520). The application ends process 500 thereafter.

Thus, a computer implemented method, system or apparatus, and computer program product are provided in the illustrative embodiments for cognitive recapitulation of social media content and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving a feedback value of a user, the feedback value corresponding to a content of a current post on a social media service;
   analyzing the content to determine a context of the current post;
   computing a range of feedback values corresponding to the context;
   adjusting the range of feedback values according to a historical emotional profile of the user, forming a first adjusted range of feedback values, the historical emotional profile of the user including information indicative of an emotional tendency of the user toward a subject-matter of at least one previous post;
   adjusting the first adjusted range of feedback values based upon a measured external environmental factor acting upon the user at a time of the current post forming a second adjusted range of feedback values, the environmental factor including a condition of an environment in which the user is present at the time of the current post;
   using the second adjusted range of feedback values as the range of feedback values;

selecting, responsive to the feedback value being outside the range of feedback values, a set of contents, the set of contents spanning a period prior to a time of the current post, and the set of contents corresponding to the context, wherein the set of contents omits another post that is within the period and is related to the current post;

constructing a recap timeline using the set of contents; and rendering the recap timeline relative to the current post.

2. The method of claim 1, further comprising:
adjusting the range of feedback values responsive to a readability metric of the content of the current post, forming an adjusted range of feedback values; and
using the adjusted range of feedback values as the range of feedback values.

3. The method of claim 1, further comprising:
adjusting the range of feedback values responsive to an understandability metric of the content of the current post, forming an adjusted range of feedback values; and
using the adjusted range of feedback values as the range of feedback values.

4. The method of claim 1, further comprising:
adjusting the range of feedback values responsive to a temporal condition related to the current post, forming an adjusted range of feedback values; and
using the adjusted range of feedback values as the range of feedback values.

5. The method of claim 1, further comprising:
measuring a biometric data of the user, wherein the feedback value comprises the measurement of the biometric data of a user, and wherein the biometric data is generated responsive to the user accessing the content of the current post.

6. The method of claim 5, further comprising:
capturing an image of a facial expression of the user, wherein the biometric data comprises the image of the facial expression of the user; and
quantifying the facial expression into the feedback value.

7. The method of claim 5, further comprising:
capturing an audible expression of the user, wherein the biometric data comprises the audible expression of the user; and
quantifying the audible expression into the feedback value.

8. The method of claim 1, wherein the set of contents comprises a previous post by an author of the current post.

9. The method of claim 1, wherein the set of contents comprises a content responsive to a previous post by an author of the current post.

10. The method of claim 1, wherein the set of contents comprises data from a source external to the social media service.

11. The method of claim 1, wherein the other post is related to the current post by virtue of a common author, and wherein the other post is unrelated to the context of the current post.

12. A computer usable program product comprising one or more computer-readable storage devices, and program instructions stored on at least one of the one or more storage devices, the stored program instructions comprising:
program instructions to receive a feedback value of a user, the feedback value corresponding to a content of a current post on a social media service;
program instructions to analyze the content to determine a context of the current post;
program instructions to compute a range of feedback values corresponding to the context;
program instructions to adjust the range of feedback values according to a historical emotional profile of the user, forming a first adjusted range of feedback values, the historical emotional profile of the user including information indicative of an emotional tendency of the user toward a subject-matter of at least one previous post;
program instructions to adjust the first adjusted range of feedback values based upon a measured external environmental factor acting upon the user at a time of the current post forming a second adjusted range of feedback values, the environmental factor including a condition of an environment in which the user is present at the time of the current post;
program instructions to use the second adjusted range of feedback values as the range of feedback values;
program instructions to select, responsive to the feedback value being outside the range of feedback values, a set of contents, the set of contents spanning a period prior to a time of the current post, and the set of contents corresponding to the context, wherein the set of contents omits another post that is within the period and is related to the current post;
program instructions to construct a recap timeline using the set of contents; and
program instructions to render the recap timeline relative to the current post.

13. The computer usable program product of claim 12, further comprising:
program instructions to adjust the range of feedback values responsive to a readability metric of the content of the current post, forming an adjusted range of feedback values; and
program instructions to use the adjusted range of feedback values as the range of feedback values.

14. The computer usable program product of claim 12, further comprising:
program instructions to adjust the range of feedback values responsive to an understandability metric of the content of the current post, forming an adjusted range of feedback values; and
program instructions to use the adjusted range of feedback values as the range of feedback values.

15. The computer usable program product of claim 12, further comprising:
program instructions to adjust the range of feedback values responsive to a temporal condition related to the current post, forming an adjusted range of feedback values; and
program instructions to use the adjusted range of feedback values as the range of feedback values.

16. The computer usable program product of claim 12, wherein the computer usable code is stored in a computer readable storage device in a data processing system, and wherein the computer usable code is transferred over a network from a remote data processing system.

17. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive a feedback value of a user, the feedback value corresponding to a content of a current post on a social media service;

program instructions to analyze the content to determine a context of the current post;

program instructions to compute a range of feedback values corresponding to the context;

program instructions to adjust the range of feedback values according to a historical emotional profile of the user, forming a first adjusted range of feedback, the historical emotional profile of the user including information indicative of an emotional tendency of the user toward a subject-matter of at least one previous post;

program instructions to adjust the first adjusted range of feedback values based upon a measured external environmental factor acting upon the user at a time of the current post forming a second adjusted range of feedback values, the environmental factor including a condition of an environment in which the user is present at the time of the current post;

program instructions to use the second adjusted range of feedback values as the range of feedback values;

program instructions to select, responsive to the feedback value being outside the range of feedback values, a set of contents, the set of contents spanning a period prior to a time of the current post, and the set of contents corresponding to the context, wherein the set of contents omits another post that is within the period and is related to the current post;

program instructions to construct a recap timeline using the set of contents; and program instructions to render the recap timeline relative to the current post.

\* \* \* \* \*